Figure 1:
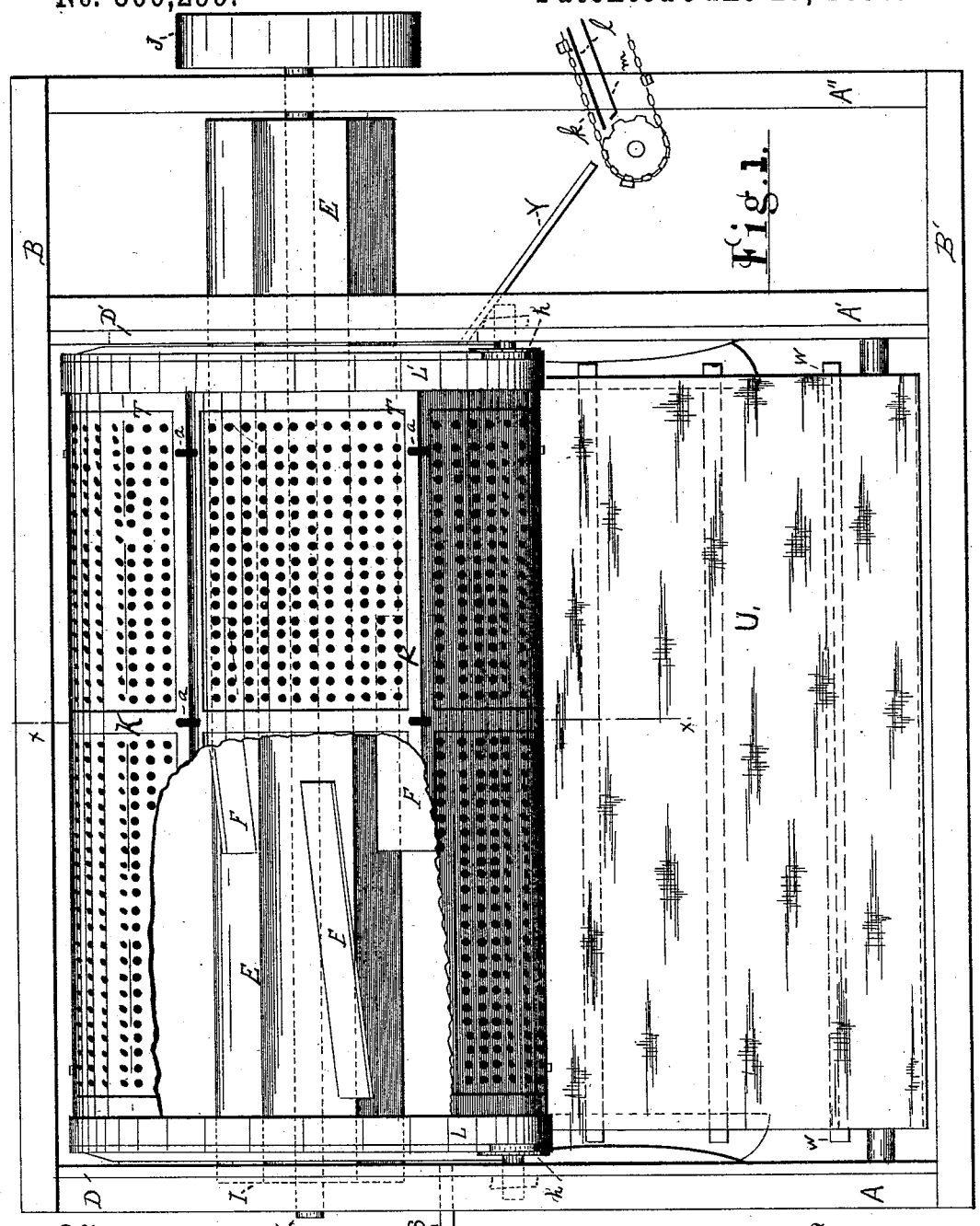

(No Model.) 4 Sheets—Sheet 2.

R. P. SCOTT & C. P. & J. A. CHISHOLM.
PEA HULLING MACHINE.

No. 500,299. Patented June 27, 1893.

Witnesses:
Oscar A. Michel
Chas. R. Michel

Inventors:
Robert P. Scott,
Charles P. Chisholm and
John A. Chisholm.
By L. H. Scott, Atty.

(No Model.) 4 Sheets—Sheet 3.

R. P. SCOTT & C. P. & J. A. CHISHOLM.
PEA HULLING MACHINE.

No. 500,299. Patented June 27, 1893.

WITNESSES:
Oscar A. Michel
Chas. R. Michel

INVENTORS:
Robert P. Scott,
Charles P. Chisholm, and
John A. Chisholm.
BY L. H. Scott. ATTY.

THE NORRIS PETERS CO., PHOTO-LITHO., WASHINGTON, D. C.

(No Model.) 4 Sheets—Sheet 4.
R. P. SCOTT & C. P. & J. A. CHISHOLM.
PEA HULLING MACHINE.

No. 500,299. Patented June 27, 1893.

Witnesses—
Oscar A. Michel
Chas. R. Michel

Inventors—
Robert P. Scott,
Charles P. Chisholm, and
John A. Chisholm.
by L. H. Scott, Atty

UNITED STATES PATENT OFFICE.

ROBERT P. SCOTT, OF BALTIMORE, MARYLAND, AND CHARLES P. CHISHOLM AND JOHN A. CHISHOLM, OF OAKVILLE, CANADA.

PEA-HULLING MACHINE.

SPECIFICATION forming part of Letters Patent No. 500,299, dated June 27, 1893.

Application filed May 2, 1891. Serial No. 391,323. (No model.)

*To all whom it may concern:*

Be it known that we, ROBERT P. SCOTT, a citizen of the United States, residing at the city of Baltimore, in the State of Maryland, and CHARLES P. CHISHOLM and JOHN A. CHISHOLM, both citizens of the Dominion of Canada, residing at Oakville, in the county of Halton, Province of Ontario, and Dominion of Canada, have invented certain new and useful Improvements in Pea-Hulling Machines, of which the following is a specification.

Our improvements relate to hulling green peas and in subsequently separating and cleaning the same from the refuse vines, pods and chaff.

The general object of our invention is to provide a rapid and efficient green pea huller adapted to operate on the entire pea vine with its pods naturally attached thereto and thereby avoid the dilatory and expensive mode of picking the peas from the vines by hand.

The machine is more especially designed for use by wholesale canners and packers where there are large quantities of green peas to be handled and prepared in a limited space of time.

In the consideration of our present invention it is necessary to bear in mind that it relates in no manner whatsoever to thrashing dry or thoroughly ripe peas, using the term in its botanical sense. While hard ripe peas are very easily thrashed after the manner of wheat and other like cereals, the hulling of the green peas used for canning purposes rests upon an entirely distinct theory therefrom, by reason of their well known delicate nature and in the fact that they must be kept perfectly free from abrasions or bruises in order to possess an equal commercial value with the hand shelled product.

Although our present invention contemplates an entire machine complete in itself adapted to executing the process according to the rule laid down in the specification annexed to the United States patent granted to C. P. and J. A. Chisholm for a method of hulling green peas, dated February 11, 1890, and numbered 421,424; yet the improvements herein described (in those points wherein they may be applicable) may be used in connection with the mechanism covered by Letters Patent of the United States granted to R. P. Scott August 7, 1888, and numbered 387,318, and to R. P. Scott and J. A. Chisholm March 19, 1889, and numbered 399,702.

Having in view the above indicated process, discovery and mechanical inventions we do not consider it necessary to enter into the minute details of such principles and mechanism as may be old and common to each and will therefore confine ourselves to present improvements.

We attain the object of our invention by means of the mechanism herein described, and illustrated in the accompanying drawings, in which—

Figure 2:
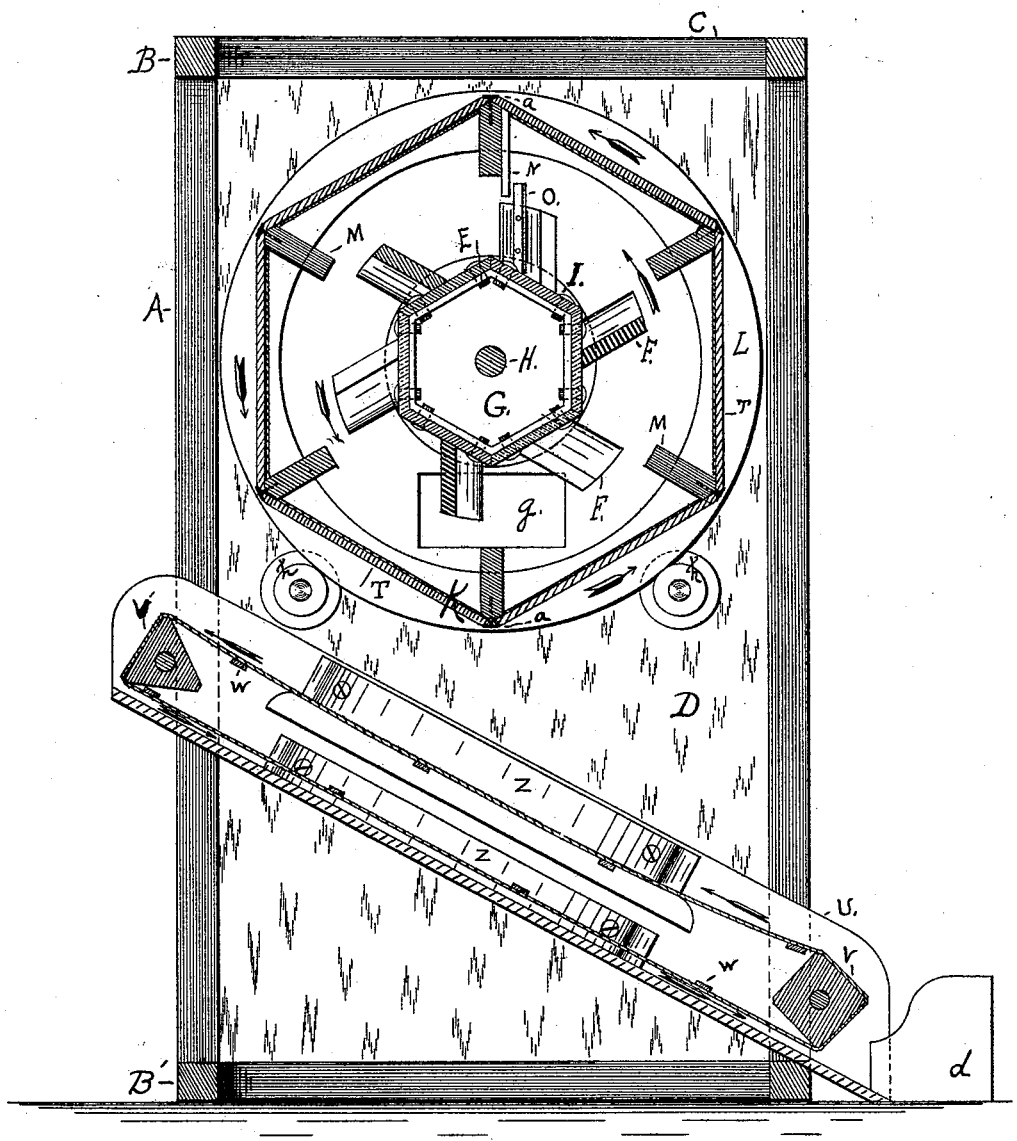
Figure 3:
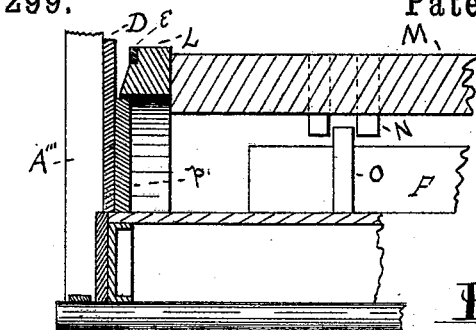
Figure 7:
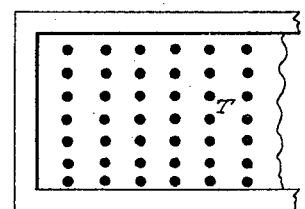
Figure 4:
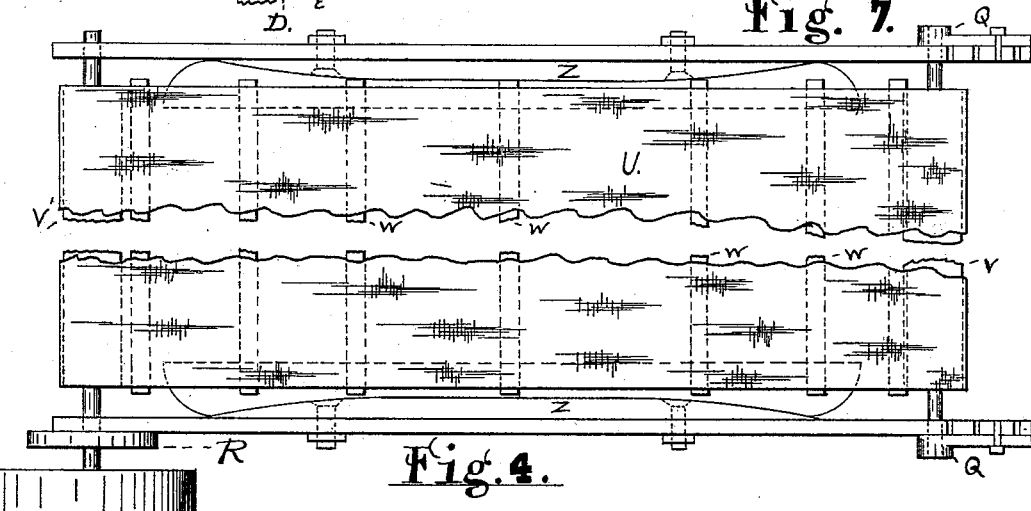
Figure 5:
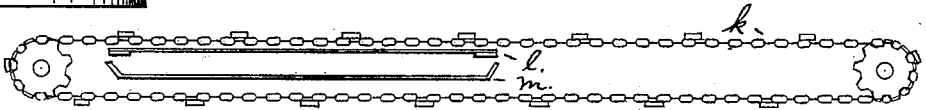
Figure 6:
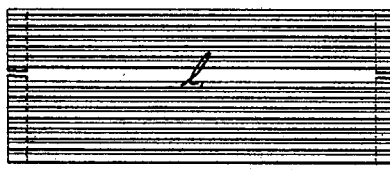
Figure 8:
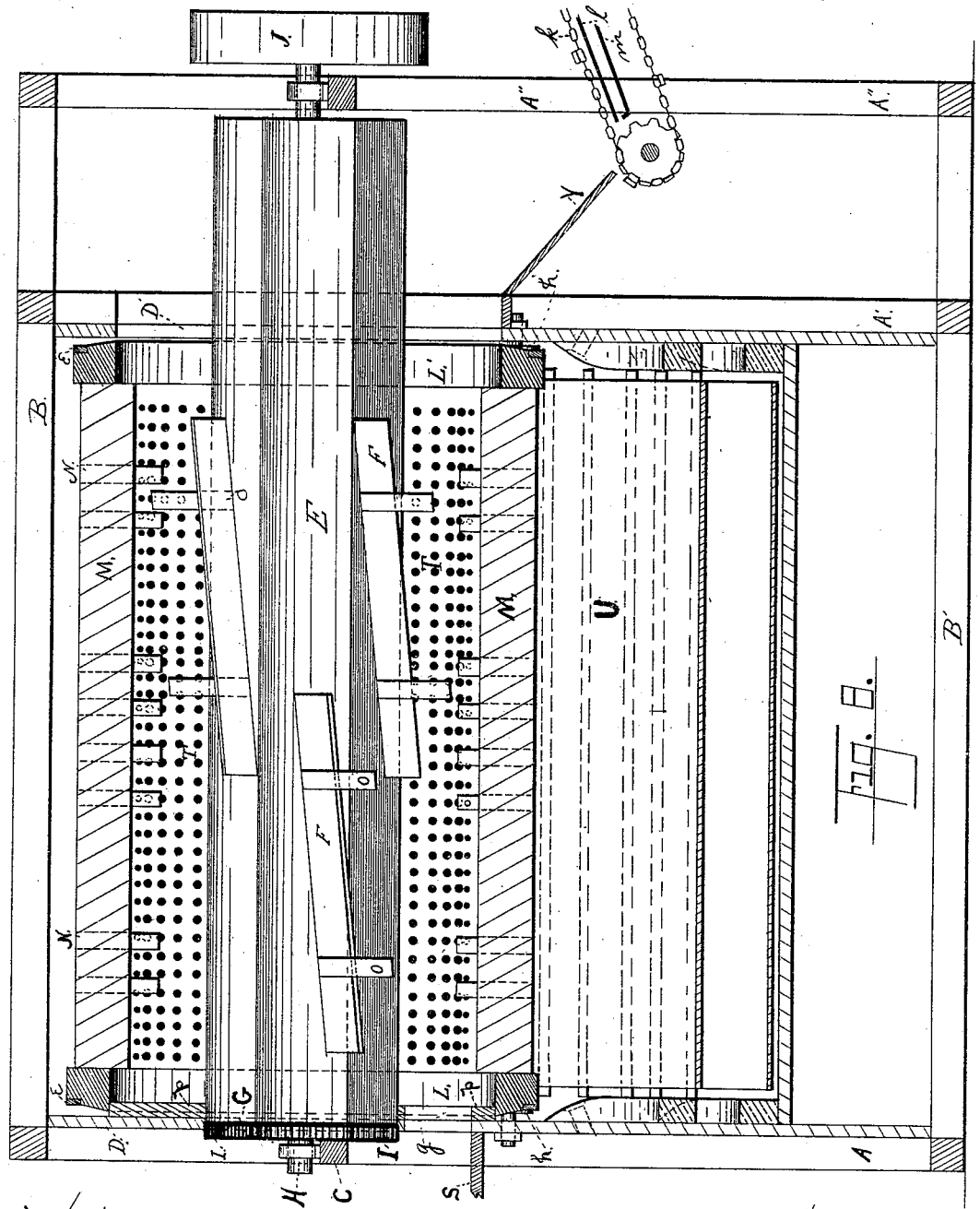

Figure 1 is a front elevation of our improved machine having the longitudinal wall or casing thereof and the shelled pea catch box removed therefrom and a portion of the outer drum covering broken away. Fig. 2 is a transverse sectional view of Fig. 1, taken on the line X, X, with the addition of the shelled pea catch box. Fig. 3 is a broken longitudinal and central sectional view of the inner and outer drum with adjacent parts, at the forward or feed end of the machine. Fig. 4 is a broken plan view of the separating apron and the improved guides thereof. Fig. 5 is a side view in elevation of the straw carrier and our improved remnant pea gleaner. Fig. 6 is a broken plan view of the remnant pea gleaner detached from the straw carrier. Fig. 7 is a broken view of one of the detachable sectional outer drum coverings. Fig. 8 is a longitudinal vertical section view completing Fig. 3 and showing the inner drum in elevation.

Similar letters of reference indicate corresponding parts throughout the several views.

In the said drawings A, A', A'', &c., are uprights of the general machine supporting frame work, B, B', &c., the longitudinal connecting rails; C, C', &c., the transverse rails, and D, D', the end wall or casing of the said frame work.

All that portion of the frame work located forward of and between the intermediate upright A' and its laterally opposite one is boxed or inclosed, with the exception of certain openings in the end sheathings hereinafter mentioned, with any suitable material as wood or heavy canvas. That entire portion of the frame work however at the rear end thereof located beyond the said intermediate uprights is uninclosed and this constitutes one of the features of our invention. By this construction a proper bearing for the rear end of the inner drum shaft hereinafter mentioned, is secured and is so located at such a distance from the discharge end of the outer drum as to assure freedom from entangling vines, thereon. At the same time the principal working parts of the machine are protected from the elements, &c., and convenient access is afforded to the attending workman in keeping the refuse pea vines from accumulating about the adjacent parts, for inspection, &c.

E indicates the rotary inner drum. Polygonal plates G, in this instance of hexagonal form, provided with marginal ribs adapted to receive bolts therein, are rigidly attached to the shaft H at suitable intervals, to which is secured the boxing of the said inner drum by bolts or other suitable means. On that portion of the said inner drum E which lies within the boundaries of the outer drum are secured the impact beaters or pod openers F which may be set slightly at an angle with the shaft H as shown. At the forward end of the said inner drum E is rigidly attached a circular plate or disk I having a diameter equal to the extreme diameter of the said inner drum E. This disk extends partially through a concentric circular opening in the end wall or casing D, as will be more clearly seen in Fig. 3. Its object is to prevent pea vines, refuse, &c., from lodging or escaping between the said wall or casing D and the inner drum E, which would otherwise occur if the said drum were not thus equipped at this point. The inner drum shaft H is journaled on the cross rail C and its longitudinally opposite one, and is provided with a power receiving pulley J at its rear end.

K indicates the rotary receiving chamber or outer drum. The primary function of the said outer drum K is to receive the pea vines and pods, carry them to an elevated position and present the same to the action of the impact beaters F, whereby the pericarps are broken open, the rupture usually taking place at the ventral suture thereof, and the unripe seeds are liberated from their cells. A secondary or ancillary function thereof is to separate in the first instance the shelled peas from the vine and pods, the peas escaping in showers through its perforated covering as will be more fully shown hereinafter. The construction of this drum is substantially as follows: The annular end pieces L are composed usually of laminated segmental layers of wood, with the exception of the exterior bordering layer e, which is preferably of iron for durability of wearing surface. The said end pieces L may be beveled or chamfered on the whole or a part of their exterior areal face from the inner toward the outer circumference thereof, as shown. This decreases the tendency of débris to lodge and wedge between the said end pieces and the opposed wall or casing D, as will be understood. To these end pieces L are rigidly attached at the inner areal faces thereof heavy longitudinal ribs M, in this instance six in number, forming thus a skeleton drum. Independent sheets of reticulated or perforated material N, as of rubber, having a suitable marginal sustaining frame and a central cross brace, are removably attached to the said skeleton drum at the ribs thereof by T head bolts or screws as shown. The said outer drum K is adapted to revolve on the subjacent flanged rollers $h$, journaled to the frame work of the machine and located under the annular end pieces of the said drum, there being used generally one pair of rollers to each end piece as will be seen.

The term open ended wherever used in the specification or claims in reference to the outer drum is to be construed as meaning openended considering the said drum aside from surrounding mechanism, that is to say independently of its connection with the general machine. A part of the feed end of this drum is of course boxed or inclosed by the forward wall of the machine, all of it in fact except a feed aperture. The said outer drum however, when considered in itself is substantially, except as to the annular end pieces, as open-ended and unobstructed as a barrel without heads.

A flat wooden guard ring $p$, of sufficient size to close, practically, with the exception of the feed opening hereinafter mentioned, the space between the forward annular end piece L and the inner drum E, is rigidly attached to the interior surface of the casing D, and is intended to prevent the escape of vines at this point. This guard ring constitutes a covering mounted upon the feed end of the frame closing a portion of the open end of the outer drum; an obvious modification would be to have the feed opening in the guard ring extend around the entire half of the drum at either the upper or lower side.

Affixed to the ribs M of the outer drum K and extending inwardly are two or more arms or hackles N which interpass with similar arms $o$, extending outwardly from the inner drum E or from the impact beaters thereof as more fully shown in Fig. 3. The purpose of these arms is to tear apart and agitate the pea vines, whereby the bunching or knotting of the latter is prevented. This feature of our invention is more especially useful when the pea vines are of the long variety as distinguished from the short or dwarf pea wherein there is little or no occasion for their use.

At the forward end of the machine is a suitable feed-opening $g$ cut through the end wall or casing D and the guard ring $p$. A platform $s$ may connect with the opening $g$ from which the peas are fed into the outer drum K through the said opening $p$. It will be observed that the outer drum K is shaftless and that the converging spokes heretofore requisite to connect the same with the interiorly located inner drum shaft are no longer necessary, and that both ends of the said drum are entirely free for the passage of the pea vines therethrough with no tendency to arrest the transit of the same. That is to say, the outer drum is open-ended and spokeless. In our present invention wherein the inner drum E is prolonged beyond the discharge end of the outer drum K as shown, the pea vines will not entwine themselves on so large an object as the said inner drum, and do not come in contact with the comparatively small shaft G which is located beyond their reach. This inner drum is of considerable diameter instead of being a mere shaft as may be seen by reference to the drawings, and is provided with beaters instead of thrashing teeth; the object being to prevent entanglement of the vines thereon, which would take place if the drum were discarded and a mere shaft were used. It is clearly manifest that these beaters are entirely different from the spike-form beaters used in wheat thrashing machines.

By this means we avoid the very serious difficulty of the vines entangling at this point which takes place where the drum ends are conterminal. It will also be noticed that the detachable sectional coverings of the outer drum K will afford convenient means for cleaning or inspection of the interiorly located mechanism. The perforations in the said coverings may be much larger than those of a machine intended to operate on the pods picked from their vines, from the fact that in the present instance the pods are attached to the vines and even if severed therefrom by the action of the impact beaters or hackle arms they are still carried along by the vines, being intermingled therewith.

U indicates the endless and traversing chaff separating apron upon which the shelled peas accompanied by more or less light chaff or dust, fall through the perforated coverings of the outer drum K under which it is located. It is hung on prismatic reels $v, v'$, which may be of hollow form or solid as shown, and which impart to the said apron a traversing upwardly inclined motion in addition to a gentle intermittent shaking motion, the effect of which is that the light refuse is carried over the top reel $v'$ and the peas roll down and deposit themselves in a suitable receptacle or catch box $d$ at the foot of the apron. This apron is, broadly speaking, old and our improvement relates to the auxiliary guiding boards Z located so as to present their convex faces to the apron edges, whereby the lateral displacement of the said apron is prevented.

While the guide boards described in the specification annexed to the United Letters Patent granted to R. P. Scott August 7, 1888, and numbered 387,318, served the general purpose of guiding the apron yet it was incomplete in the fact that the cross slats W thereon would gouge into the said boards at or near the ends of the reels. While answering the purpose fairly well on an apron of light weight and easy running it has been found entirely inadequate to meet the requirements of a very heavy apron such as is used in connection with a pea huller of a large size contemplated by our present invention. We have therefore found that the independent convex boards Z located at each edge of the said apron and removably attached to the frame work of the machine, which push the said apron over and serve to keep it in position, is a discovery of great value and usefulness in the practical working of a very large apron. While the same effect obtained by the auxiliary convex guide boards Z may be obtained by bending or convexing the guide boards originally shown in the patent last mentioned yet as a matter of fact we use an auxiliary convex board for the purpose that when it becomes worn flat or irregular by the action of the ends of the cross slats W of the apron it can be easily removed and replaced by a new board.

An indicator R may be attached to one of the reel shafts to register the number of revolutions of the same in computing royalties. Also tension regulators Q, Q', may be used in connection with the said apron, as shown.

Y indicates a chute or inclined board whereon the refuse vines or straw is immediately discharged from the outer drum, and deposited on a straw carrier $k$. The general construction of this straw carrier is such as is commonly used in connection with ordinary thrashing machines, whereby the refuse straw, or in this case the pea vines, or haulm is carried in a rearward and elevated manner and deposited in a stack at a distance from the hulling machine proper. In connection with this straw carrier is our improved gleaning device $k$ for securing any remnant shelled peas which may be still intermingled with the straw, although substantially all the peas have been secured before the vines reach this point. This feature of our invention comprises a longitudinally slatted floor or track $l$, located subjacent to the upper part of the traversing carrier, which permits the remnant peas to pass therethrough and fall into a remnant catch box $m$ underneath the said slatted floor $l$.

The pea huller proper may be set in motion through the medium of any suitable system of belts or gears, as for instance the inner drum may be driven by a belt over the pulley J, and the outer drum K may be likewise driven by a sprocket chain or belt over one of its annular end pieces.

Similar means may of course be used in connection with the apron reels and straw carrier as will be understood.

It is evident that some changes in the construction and arrangement of the different parts of our mechanisms can be resorted to without departing from the spirit of the invention and hence we do not limit ourselves to the exact construction and arrangement of its different parts but consider ourselves at liberty to make such alterations and changes as fall within the scope of our invention.

Having described our invention, what we claim, and desire to secure by Letters Patent, is—

1. A machine for hulling green peas from the vines comprising the combination of an inner revoluble drum provided with beaters and an outer revoluble drum, the latter being open-ended, thus having an uninterrupted passage way from end to end thereof for the transit of the vines therethrough substantially as described and for the purpose set forth.

2. A machine for hulling green peas from the vines comprising the combination of an inner revoluble drum provided with beaters and an outer revoluble, spokeless, shaftless and open-ended drum provided with interior longitudinal vine elevating ribs substantially as described and for the purpose set forth.

3. A machine for hulling green peas from the vines comprising the combination of a revoluble outer drum and an interior revoluble beater carrying drum, the inner drum being prolonged beyond the discharge end of the outer drum substantially as described and for the purpose set forth.

4. A machine for hulling green peas from the vines comprising the combination of an inner revoluble drum provided with beaters, an outer revoluble, spokeless, shaftless and open-ended drum, a frame in which the drums are mounted and a covering upon the frame work inclosing the outer drum with the exception of a feed aperture, substantially as described and for the purpose set forth.

5. A machine for hulling green peas from the vines comprising the combination of a revoluble outer drum and an inner revoluble beater carrying drum, the inner drum being prolonged beyond the discharge end of the outer drum, a supporting frame work, and rollers pivoted on the said frame work under each end of the outer drum substantially as described and for the purpose set forth.

6. In a machine for hulling and cleaning green peas the combination of an endless traversing apron, revolving reels supporting the said apron, transverse cleats secured to the said apron and extending from edge to edge thereon, fixed convex faced guide pieces in general line with the apron on each side thereof and having their convex surfaces toward the respective edges of the said apron substantially as described and for the purpose set forth.

7. In a machine for hulling green peas the combination of the uprights A. A'. A''. the outer revolving drums positioned between the uprights A and A', supports for said drums, the inner revolving drum positioned between the uprights A and A'' and means for supporting and rotating said drum, substantially as described.

ROBERT P. SCOTT.
CHARLES P. CHISHOLM.
JOHN A. CHISHOLM.

Witnesses:
N. J. McIntyre,
Thos. Robinson,
Gilbert Taylor Ware.